US006098277A

United States Patent [19]

Hess et al.

[11] Patent Number: 6,098,277

[45] Date of Patent: Aug. 8, 2000

[54] TOOL FOR REMOVING A PART ASSOCIATED WITH A CIRCUIT BOARD

[76] Inventors: William C. Hess, 4617 Strawberry La., Edmond, Okla. 73034-2003; Alan D. Slayton, 1603 Klabzuba, Prague, Okla. 74864

[21] Appl. No.: 09/238,894

[22] Filed: Jan. 28, 1999

[51] Int. Cl.[7] .......... B23P 19/02

[52] U.S. Cl. .......... 29/764; 29/762; 29/278

[58] Field of Search .......... 29/764, 762, 758, 29/278

[56] References Cited

U.S. PATENT DOCUMENTS 3,210,832 10/1965 Kalen .
3,657,812 4/1972 Lee .......... 30/162
4,052,788 10/1977 Hastings et al. .
4,663,838 5/1987 Dewey et al. .
4,882,838 11/1989 Jones et al. .
4,884,336 12/1989 Waters et al. .
5,058,264 10/1991 Quach .
5,311,657 5/1994 Kressman .
5,636,436 6/1997 Martin .

*Primary Examiner*—Stephen F. Gerrity
*Assistant Examiner*—Rhonda E Sands
*Attorney, Agent, or Firm*—Dinesh Agarwal, P.C.

[57] ABSTRACT

A tool for removing a part, such as stand-off, associated with a circuit board includes a generally cylindrical elongated housing which includes open top and bottom ends and defines a recess therein. An elongated punch member is slidably disposed in the recess. First and second stopper members are positioned in the recess adjacent top and bottom ends, respectively, and a third stopper member is positioned in the recess between the first and second stopper members. A spring member is biased between the first and third stopper members. The second and third stopper members are fixedly attached to the punch member and the first stopper member is fixedly attached to the housing.

13 Claims, 1 Drawing Sheet

TOOL FOR REMOVING A PART ASSOCIATED WITH A CIRCUIT BOARD

FIELD AND HISTORICAL BACKGROUND OF THE INVENTION

The present invention is directed to a tool for removing or manipulating a part associated with a circuit board, and more particularly to a tool for removing or manipulating a stand-off from a motherboard.

It is common in the computer industry to mount a circuit board to a computer casing by using a component known as the "plastic feet" or "stand-off". The circuit boards typically have drilled holes at desired locations in which a stand-off is inserted into. The stand-off includes two barbs which hold the circuit board securely in place, and the bottom of the stand-off is inserted into corresponding slots in the computer casing. Conventionally, a pair of needle-nose pliers is used to remove the feet or stand-off from the circuit board by depressing the barbs and pushing the foot back through the circuit board. This technique often leads to damaging the foot or stand-off and other components that may be present in the vicinity thereof. The use of pliers is further not very practical in the present day computers in which manipulation of various components is difficult due to the limited space and crowding of the components. Various tools for inserting, removing, or manipulating components have been proposed in the art as shown in U.S. Pat. Nos. 3,210,832; 4,052,788; 4,663,838; 4,882,838; 4,884,336; 5,058,264; 5,311,657; and 5,636,436.

The prior art tools are complex in design, difficult to use and expensive to manufacture. Therefore, there is a need in the industry for a tool for removing or manipulating a part associated with a circuit board, which is simple in design and inexpensive to manufacture.

OBJECTS AND SUMMARY OF THE INVENTION

The principal object of the present invention is to provide a tool for removing or manipulating a part associated with a circuit board which overcomes the disadvantages associated with the prior art tools and techniques.

Another object of the present invention is to provide a tool for removing a part associated with a circuit board which is simple in design, requires fewer number of parts, and has a more streamline appearance thereby making it easy to use in crowded areas.

Yet another object of the present invention is to provide a tool for removing a part associated with a circuit board that includes a spring-biased punch member which, together with manual pressure, significantly aids in the removal process.

Still yet another object of the present invention is to provide a tool for removing a part associated with a circuit board which greatly facilitates removal of the part in today's more complex and compact computers.

An additional object of the present invention is to provide a tool for removing a part associated with a circuit board which removes the part with minimum effort and little or no damage to the components involved.

Yet an additional object of the present invention is to provide a tool for removing a part associated with a circuit board which is inexpensive to manufacture and has a compact, slim and streamline design permitting easy access to and manipulation of a stand-off positioned in the more crowded areas of today's computers.

Still yet an additional object of the present invention is to provide a tool for removing a part associated with a circuit board which can be easily manufactured and assembled from the readily available components, such as brass or aluminum tubing, etc.

In summary, the main object of the present invention is to provide a tool for removing a part associated with a circuit board which requires fewer parts to assemble, is inexpensive to manufacture, simple and streamline in design, and which provides significantly improved access to the part in today's compact computers. In accordance with the invention, the tool includes a generally cylindrical elongated housing which includes open top and bottom ends and defines a recess therein. An elongated punch member is slidably disposed in the recess. First and second stopper members are positioned in the recess adjacent top and bottom ends, respectively, and a third stopper member is positioned in the recess between the first and second stopper members. A spring member is biased between the first and third stopper members. The second and third stopper members are fixedly attached to the punch member and the first stopper member is fixedly attached to the housing.

BRIEF DESCRIPTION OF THE DRAWINGS

The above and other objects, novel features and advantages of the present invention will become apparent from the accompanying detailed description of the invention as illustrated in the drawings, in which.

DETAILED DESCRIPTION OF THE INVENTION

Figure 1:
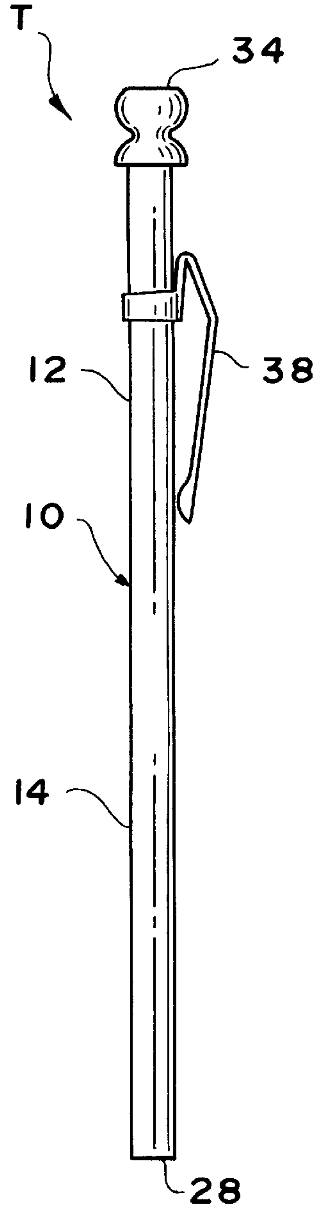
FIG. 1 is an elevational view of the tool of the present invention.
Figure 2:
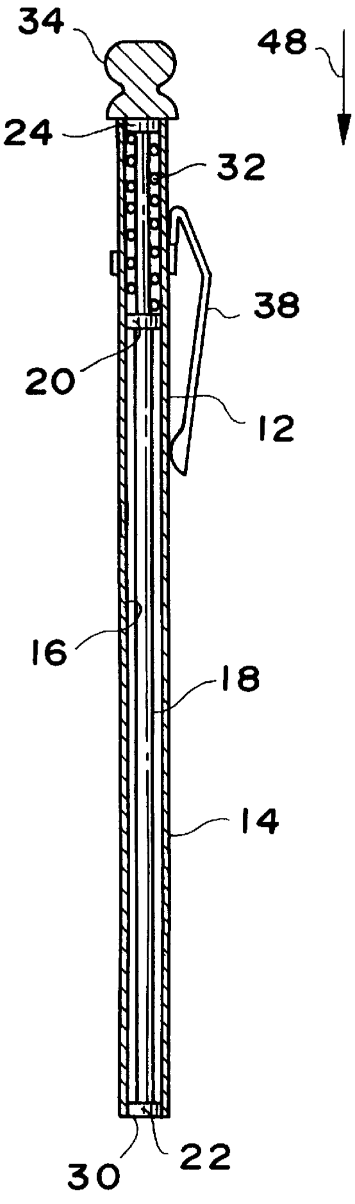
FIG. 2 is a vertical cross-sectional view of the tool shown in FIG. 1.
Figure 3:
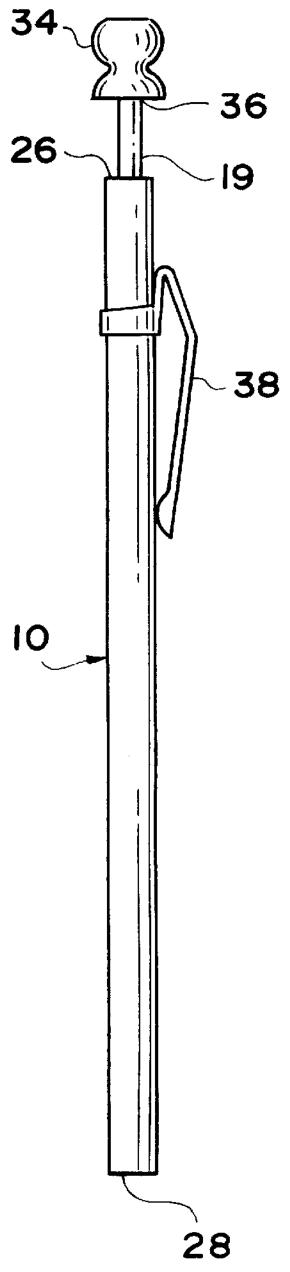
FIG. 3 illustrates the tool of the invention in the extended position when in use.

As best shown in FIGS. 1–3, the tool T of the present invention includes a generally cylindrical, elongated housing 10 made of a suitable metal or plastic material, such as brass, aluminum, or the like. The housing 10 includes an upper-half portion 12 and a lower-half portion 14, and defines a recess 16 therein, preferably extending the length thereof. An elongated, preferably solid, punch or plunger rod 18 extends through the recess 16. Stopper members 20 and 22 are fixedly mounted to the rod 18, and stopper member 24 is fixedly mounted to the housing 10 within recess 16. Preferably, the stopper member 24 is positioned adjacent the top opening 26 of the housing 10, and the stopper member 22 is positioned adjacent the bottom opening 28, such that the lower surface 30 of the stopper member 22 is coplanar with the bottom opening 28. In a preferred form, the stopper members 20 and 24 are positioned within the upper-half 12 of the housing 10, and the stopper member 22 is positioned within the lower-half 14 thereof. A compression spring 32 is biased between the stopper members 20 and 24 for aiding in the removal of the stand-off or the like member SO from a circuit board CB.

A push-handle 34 is mounted to the top 36 of plunger rod 18. A suitable pocket-clip 38 is mounted to the housing 10 for the ease of carrying the tool T in a user's pocket.

Figure 4:
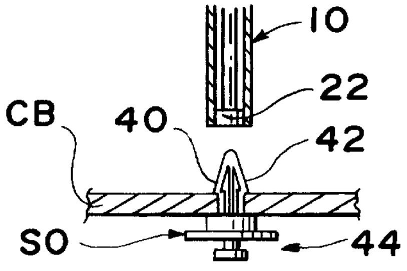
FIG. 4 is a partial sectional view of the tool of the invention shown positioned over a stand-off to be pushed-out from the associated circuit board.

As best shown in FIG. 4, preferably the length of the plunger rod 18 between stopper members 20 and 24 is less than the length thereof between the stopper members 20 and 22. More preferably, the length of the plunger rod 18 between stopper members 20 and 24 is about one-third of the length between the stopper members 20 and 22.

USE AND OPERATION

Figure 5:
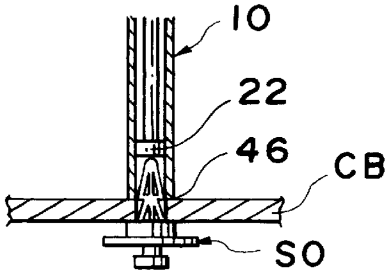
FIG. 5 is a view similar to FIG. 4, showing the tool of the invention positioned around the stand-off and immediately prior to being pushed-out from the circuit board.

As shown in FIGS. 4–5, the stand-off SO includes barbs 40 and 42, which securely hold the circuit board CB thereto. The bottom portion 44 of the stand-off SO is typically inserted into a corresponding slot in a computer casing (not shown). In use, the tool T is positioned over the stand-off SO (FIG. 4) and pushed down such that the barbs 40 and 42 are compressed inwardly to correspond with the hole 46 in the circuit board CB. As the housing 10 is pushed down over the stand-off SO, the plunger rod 18 moves upwardly (FIG. 5) thereby compressing the spring 32 by virtue of the stopper member 20 moving upwardly toward the stopper member 24 which is fixed within the housing 10. As a result, the upper portion 19 of the plunger rod 18 slides outwardly from the housing 10 raising the push-handle 34 (FIG. 3). Once the tool T is secured over the circuit board CB, the user then presses downwardly on the push-handle 34, as indicated by arrow 48, to push-out the stand-off SO from the hole 46 in the circuit board CB. It is noted herewith that in addition to the manual pressure applied by the user on the push-handle 34, the spring 32 which is in a compressed state, further aids in pushing the plunger rod 18 downwardly thereby applying an added pressure on the stand-off SO.

From the above, is can be readily observed that the tool T of the present invention is very convenient and easy to use, and would provide improved access to a component in a crowded environment in view of its slim, compact and streamline configuration.

While this invention has been described as having a preferred design, it is understood that it is capable of further modifications, uses and/or adaptations following in general the principle of the invention, and including such departures from the present disclosure as those come within the known or customary practice in the art to which the invention pertains, and as may be applied to the central features hereinsetforth and fall within the scope of the invention and the limits of the appended claims.

What is claimed is:

1. A tool for removing a part associated with a circuit board, comprising:

a) a generally cylindrical elongated housing including open top and bottom ends and defining a recess therein;

b) an elongated punch member slidably disposed in said recess;

c) first and second stopper members positioned in said recess adjacent top and bottom ends, respectively;

d) a third stopper member positioned in said recess between said first and second stopper members;

e) a spring member positioned between said first and third stopper members;

f) said second and third stopper members being fixedly attached to said punch member; and g) said first stopper member being fixedly attached to said housing and including an exterior surface substantially coplanar with the top end of said housing.

2. The tool of claim 1, further comprising:

a) a push-handle member operably connected with said punch member.

3. The tool of claim 2, wherein:

a) said handle member is positioned externally of said housing.

4. The tool of claim 1, wherein:

a) said housing comprises upper-half and lower-half portions; and b) said first and third stopper members are positioned in said upper-half portion.

5. The tool of claim 1, wherein:

a) said second stopper member includes an exterior surface substantially coplanar with the bottom end of said housing.

6. The tool of claim 1, wherein:

a) said housing comprises a single-piece made from a metal material.

7. The tool of claim 1, wherein:

a) said housing comprises a single-piece made from a plastic material.

8. The tool of claim 1, further comprising:

a) a pocket-clip member operably associated with said housing.

9. The tool of claim 1, wherein:

a) the length of said punch member between said first and third stopper members is less than the length thereof between said second and third stopper members.

10. A tool for removing a stand-off member from a motherboard, comprising:

a) a generally cylindrical elongated, single-piece housing including open top and bottom ends and defining a recess therein;

b) said housing including upper-half and lower-half portions;

c) an elongated punch member slidably disposed in said recess;

d) first and second stopper members positioned in said recess adjacent said top and bottom ends, respectively;

e) a third stopper member positioned in said recess between said first and second stopper members;

f) a spring member positioned between said first and third stopper members;

g) said second and third stopper members being fixedly attached to said punch member;

h) said first stopper member being fixedly attached to said housing;

i) said first and third stopper members being positioned in said upper-half portion of said housing; and j) a push-handle member attached to said punch member and positioned externally of said housing.

11. The tool of claim 10, further comprising:

a) a pocket-clip member mounted externally on said housing.

12. The tool of claim 10, wherein:

a) the length of said punch member between said first and third stopper members is less than the length thereof between said second and third stopper members.

13. The tool of claim 10, wherein:

a) said housing is made from a metal or plastic material.

* * * * *